US006223175B1

(12) United States Patent
George et al.

(10) Patent No.: US 6,223,175 B1
(45) Date of Patent: Apr. 24, 2001

(54) METHOD AND APPARATUS FOR HIGH-SPEED APPROXIMATE SUB-STRING SEARCHES

(75) Inventors: Glen George, Pasadena; Hui Cai, Cuptertino, both of CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/173,921

(22) Filed: Oct. 16, 1998

Related U.S. Application Data

(60) Provisional application No. 60/063,748, filed on Oct. 17, 1997.

(51) Int. Cl.[7] ............................................. G06F 17/30
(52) U.S. Cl. ................... 707/6; 707/2; 707/6; 706/13; 709/214; 712/20; 712/203
(58) Field of Search .................................. 707/2, 6, 200, 707/11; 705/26, 54, 86; 709/214; 712/10, 13, 20, 23, 203; 700/11, 17; 345/20, 22, 520

(56) References Cited

U.S. PATENT DOCUMENTS

| | | | |
|---|---|---|---|
| 5,251,131 | * 10/1993 | Masand et al. | 704/9 |
| 5,335,106 | * 8/1994 | Paquin et al. | 359/180 |
| 5,432,934 | * 7/1995 | Levin et al. | 713/200 |
| 5,632,041 | * 5/1997 | Peterson et al. | 712/16 |
| 5,706,498 | * 1/1998 | Fujimiya et al. | 707/6 |
| 5,964,860 | * 10/1999 | Peterson et al. | 712/19 |
| 6,058,385 | * 5/2000 | Koza et al. | 706/13 |
| 6,108,648 | * 8/2000 | Lakshmi et al. | 707/2 |
| 6,137,839 | * 10/2000 | Mannering et al. | 375/260 |

OTHER PUBLICATIONS

Huang H. et al., "Gene Alert—a sequence search results keyword parser," IEEE Engineering in Medicine and Biology Magazine, Mar.–Apr. 1998, vol. 17, Issue: 2, pp. 119–122.*

Roos, Thomas et al., "A Data Structure of Approximate String Searching," Proceedings of the Twenty–Seventh Annual Hawaii International Conference on System Science, Volume. V, Jan. 4–7, 1994, pp. 45–46.*

(List continued on next page.)

*Primary Examiner*—Hosain T. Alam
*Assistant Examiner*—Shahid Alam
(74) *Attorney, Agent, or Firm*—Fish & Richardson P.C.

(57) ABSTRACT

A technique for searching in a source sequence for a target sequence using parallel processing. Each symbol of the target sequence to a corresponding processing element, where the processing elements are connected to form an array and at least one processing element supplies an accumulated score to a succeeding processing element in the array; supplying a symbol from the source sequence in parallel to all of the processing elements, so that each processing element receives the same source sequence symbol; determining a score based on the source sequence symbol and the processing element's target sequence symbol for each processing element; adding the score for a processing element to the accumulated score received by that processing element from a preceding processing element to generate a local score; comparing the local score to an accumulation value; when the local score is less than the accumulation value, supplying a default accumulation score to the succeeding processing element as the accumulated score; and when the local score is not less than the accumulation value, supplying the local score to the succeeding processing element as the accumulated score.

34 Claims, 6 Drawing Sheets

OTHER PUBLICATIONS

Sastry, Raghu et al., "A Systolic Array for Approximate String Matchine," Proceedings of the 1993 IEEE International Conference on Computer Design: VLSI in Computers and Processors, ICCD '93, Oct. 3–6, 1993, pp. 402–405.*

Yoshikawa Takanobu et al., "On the Implementation of a Phylogenetic Tree Database," 1999 IEEE Pacific Rim Conference on Communications, Computers and Signal Processings, Aug. 22–24, 1999 pp. 42–45.*

T.F. Smith and M. S. Waterman; Identification of Common Molecular Subsequences; Mar. 25, 1981; Journal of Molecular Biology, 147:195–197.

* cited by examiner

METHOD AND APPARATUS FOR HIGH-SPEED APPROXIMATE SUB-STRING SEARCHES

This application claims the benefit of U.S. Provisional Application No. 60/063,748, filed Oct. 17, 1997.

TECHNICAL FIELD

The present disclosure relates to sequence searching, and more specifically to computer implemented sequence searching using parallel processing for purposes such as the human genome effort.

BACKGROUND

In 1983, Doolittle and colleagues reported similarity between a newly discovered oncogene and a normal gene for growth. Based on this similarity, these researchers concluded that cancer is probably caused by mutation of an otherwise normal growth gene. This incident demonstrates the value of genetic database search techniques.

A pair of similar DNA sequences usually represent code for similar strands of amino acids and therefore express similar functions or structures. When a new strand of DNA is sequenced, the strand homology to a well-studied and well-documented strand of DNA stored in the DNA database usually provides the first clue as to the new strand's function. Instead of testing and analyzing the coded protein and generations of bacteria, biologists can search the database for similar sequences. The researchers can then design experiments to test the results of the search.

As a result of the enormous improvement of DNA sequencing technology, the rate of growth of the DNA database has grown exponentially over the last decade from 1.5 million nucleotides per year in 1989 to an expected 1.6 billion nucleotides per year in 1999. However, this boom in the genetic database poses serious problems for conventional database search methods. These conventional methods are based on heuristic or dynamic programming techniques which typically require time in the order is of N×M, where N is the length of the database sequence being searched and M is the length of the target sequence being searched for. Two examples of heuristic search techniques are FASTP described by D. J. Lipman, et al., in "Rapid and sensitive protein similarity searches", Science 227: 1435–1441, 1985, and BLAST described by Stephen Altschul, et al., in "Basic local alignment search tool", J. of Molecular Biology, 215:403–410, 1990. Dynamic programming techniques are described by T. F. Smith, et al., in "Identification of Common Molecular Subsequences", J. of Molecular Biology, 147:195–197.

SUMMARY

The present disclosure describes methods and apparatus implementing a technique for searching in a source sequence for a target sequence using parallel processing. The technique preferably provides an indication of similarity between the target sequence and sub-strings within the source sequence.

In one aspect, the technique includes supplying each symbol of the target sequence to a corresponding processing element, where the processing elements are connected to form an array and at least one processing element supplies an accumulated score to a succeeding processing element in the array; supplying a symbol from the source sequence in parallel to all of the processing elements, so that each processing element receives the same source sequence symbol; determining a score based on the source sequence symbol and the processing element's target sequence symbol for each processing element; adding the score for a processing element to the accumulated score received by that processing element from a preceding processing element to generate a local score; comparing the local score to an accumulation value; when the local score is less than the accumulation value, supplying a default accumulation score to the succeeding processing element as the accumulated score; and when the local score is not less than the accumulation value, supplying the local score to the succeeding processing element as the accumulated score.

In another implementation, a system for comparing a target sequence of symbols having a first number of symbols against a source sequence of symbols having a second number of symbols, includes a processor array for calculating an accumulated score based on comparing symbols of the target sequence to symbols of the source sequence, and a result storage table connected to the processor array for storing accumulated scores. The processor array includes a plurality of processing elements, where: at least one processing element is connected to another processing element, all the processing elements receive a common symbol from the source sequence, and each processing element receives a different symbol from the target sequence.

The design of the processing elements provides a dense, inexpensive, and very fast solution to sub-string searching. These processing elements can provide inexpensive database searches at speeds of 100 million comparisons per second. In addition, with minimal modification, the processing elements can be modified to provide bidirectional searching, effectively doubling the number of comparisons.

DETAILED DESCRIPTION

Figure 1A:
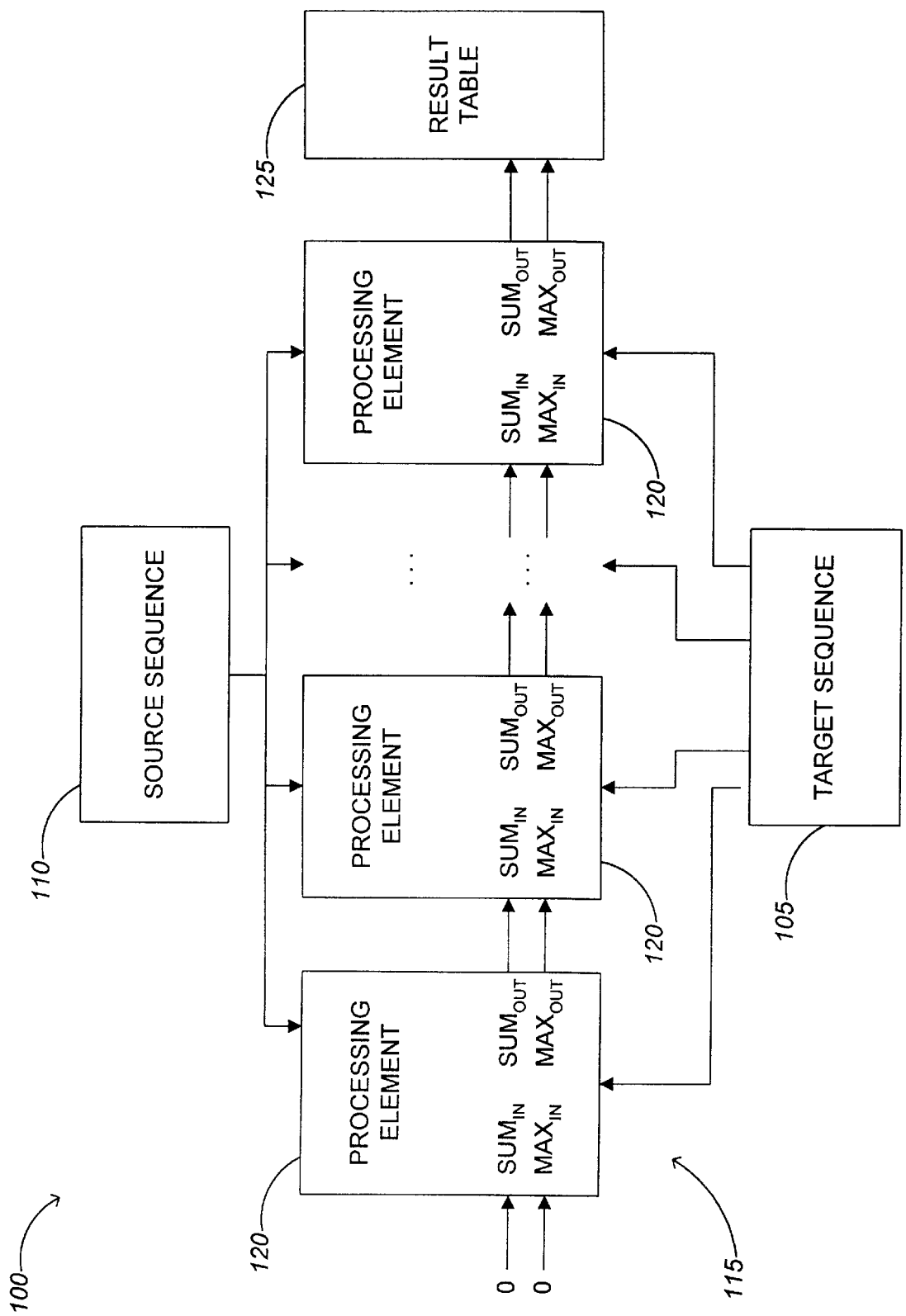
FIG. 1A shows a block diagram of a system for comparing a target sequence to a database sequence.

The present disclosure describes methods and apparatus implementing a technique for using a parallel processor array to search a source sequence for a target sequence. As described below, the target sequence is compared to a source sequence from a database at each alignment (i.e., correspondence of elements between the target sequence and the source sequence). The parallel and direct nature of the disclosed technique provides a highly efficient and very fast search process. While the preferred implementations of the present disclosure are described in the context of genetic database searching, the technique is applicable in any area requiring comparison and searching among sequences of symbols.

In genetic database searching, a fundamental question is the definition of similarity. Because the most relevant issues to biologists are typically the function and the structure of a protein coded by a sequence of genetic information, similarity in this context parallels these issues. There are basically two types of similarity: global similarity and local similarity. Global similarity describes an overall base pair match between the target sequence and the source sequence. Local similarity describes the match between "conserved" regions of the target and source sequences, ignoring long stretches of mismatches in the relatively unconserved regions.

Conserved regions represent those regions of evolutionary importance, typically regions which determine the function of the coded protein. Much of the DNA database is regions of introns that are not expressed in functionality, i.e., they have no known function. Such regions can change over time in differently-related species. Even in closely related species, these non-functional regions tend to vary much more frequently than the functional regions or active sites.

A similar situation also exists for amino acid sequences. A most important part of a protein contributes to the protein structure that allows the protein to bind to different substances. The amino acids that construct the binding site for a protein tend to be similar to those amino acids in functionally similar proteins. The amino acids that make up the rest of the protein, however, are much more likely to vary.

The technique of the present disclosure preferably addresses both global and local similarities. The technique measures the similarity of local alignment and also searches globally for any local alignments worth noting by producing a score at each alignment. Those scores are analyzed which effectively takes into account both the local and global alignment.

Sub-sequence searching methods typically employ some kind of similarity scoring system. The scoring system takes into consideration the probability of transmutation to determine a descriptive set of scores for all possible residues. For protein databases, the score system often employed is the PAM series of substitution matrices. For common lengths of amino acids chains (19–50 residues) in a typical size protein database (approximately 10 million residues), the most broadly sensitive matrix is PAM-120. For short but strong cases and weak but long cases, PAM-40 is typically used in conjunction with PAM-250. These matrices are described by Stephen F. Altschul in "Amino Acid Substitution Matrices from an Information Theoretic Perspective", J. of Molecular Biology, 219: 555–565, 1991, and in "A Protein Alignment Scoring System Sensitive at All Evolutionary Systems", J. of Molecular Biology, 36:290–300, 1993. For nucleic acid databases, the simple and commonly used scoring system is 5/-4, 5 for a match, -4 for a mismatch. The technique of the present disclosure allows users to select whichever scoring system or systems are most appropriate for the particular application.

In one implementation, a source sequence stored in a database is compared to a target sequence. The database sequence includes N residues or bases. The target sequence includes M residues or bases. An array of parallel processors includes a plurality of processor cells or elements which are preferably structurally substantially identical. Each cell includes one base of the target sequence of bases. As described below, the processor cells also include summation and comparison logic. The database sequence is compared sequentially one element at a time to all of the elements of the target sequence. At each clock pulse, a successive base from the database sequence is supplied to all of the cells in the parallel processor array. The supplied base from the database sequence is compared to the base stored in each processor cell. The comparison preferably generates a numeric score from a scoring system, as described above.

The processor cells are arranged and connected in a sequence, corresponding to the sequence of the bases in the target sequence. After the comparison in a cell is made, the score is added to an accumulated score received from the preceding cell in the array. The sum is shifted from the processor cell which generated the score to the next cell in the array, described in more detail below. The succeeding cell uses the received sum as the accumulated score in the next cycle. At the next clock pulse, the next base from the database sequence is supplied to the parallel processor cells and the cycle repeats. Hence, as the database moves across the parallel processor array, local sums are repeatedly added as scores are shifted across the processor cells.

After M operations, the total sum for a first alignment is shifted out of the final cell of the processor array. This final accumulated score is stored in a result table. According to predetermined criteria, the result table determines whether the received final accumulated score is to be retained or not. At each clock pulse a new final accumulated score is supplied to the result table. The final accumulated scores are preferably placed into a table including a predetermined number of entries. As each new final accumulated score is supplied to the result table, the new final accumulated score replaces the sum already stored in the table which is the smallest of those scores less than the new final accumulated score. Alternatively, final accumulated scores are retained in the result table if they are over a predetermined cutoff period. These predetermined values are preferably supplied by a user.

Accordingly, the entire database sequence is analyzed in N clock pulses. The total processing time is then determined by the speed of the processor. As noted above, in conventional systems which lack this parallel processing functionality, the time needed for such a search is typically on the order of N×M. The present technique reduces the processing time to the order of N and the space required is on the order of M. While some conventional designs do employ parallel processors in searching, the conventional techniques are typically too complicated to take full advantage of the processors' speed.

To analyze the local similarity, the accumulated sum reflects a local sum. This local sum allows the present technique to adjust to gaps of mismatches in the database sequence. A long stretch of mismatches in the beginning of the database sequence is disregarded. The local sum is recorded only when the local sum indicates that the target sequence and the database sequence are producing matches, such as when the local sum becomes positive. The mismatches in the middle of a sequence of comparison are added to the accumulated sum so long as the accumulated sum does not become negative. Where the local sum exceeds the accumulated sum, the local sum replaces the accumulated sum and if the local sum is less than the accumulated sum then the local is disregarded. As noted above, the accumulated sum is shifted to the next cell. This process is described in more detail below.

The efficient search process of the preferred technique can be easily implemented such as through VLSI technology. Given a processor running at a speed of 50 to 100 megahertz, there are 50 to 100 million clock pulses per second. Each shift in comparison in the processor array can be accomplished in one clock period. Accordingly, the present techniques provides 50 to 100 million comparison each second. For example, the present technique can search the GenBank entry from August of 1995 including 353,713,490 bases in approximately 3 to 7 seconds.

FIG. 1A shows a block diagram of a system 100 for comparing a target sequence 105 to a database sequence 110. This and other systems as described herein can be implemented in digital electronic circuitry, or in computer hardware, firmware, software, or in combinations of them. For example, the system can be formed using a digital signal processor ("DSP"), or software using any general-purpose processor. The database sequence 110 is connected in parallel to a processor array 115. The processor array 115 includes a plurality of processing elements or cells 120. Each processing element 120 corresponds to a symbol or element of the target sequence 105. For example, where the target sequence 105 includes 5 elements, the processor array 115 includes 5 processing elements 120, each corresponding to a different element of the target sequence 105. Each processing element 120 is connected in series to a succeeding processing element 120. Each processing element 120 supplies an accumulated score or sum and a maximum value to the corresponding succeeding processing element 120 (indicated by the connection between $SUM_{OUT}$ and $SUM_{IN}$ and $MAX_{OUT}$ and $MAX_{IN}$). The final processing element 120 in the array 115 supplies the accumulated score and maximum value to a result table 125. As described above, the result table 125 stores the accumulated score and maximum value supplied by the final processing element 120 according to predetermined criteria. The initial processing element 120 in the array 115 receives predetermined values, such as zero, to initialize the accumulated score and maximum value.

Each of the components shown in FIG. 1A is connected to a clock (not shown). With each clock pulse, a new successive element of the database sequence 110 is supplied in parallel to each of the processing elements 120. Each processing element 120 generates a score for the current supplied element of the database sequence 110 according to the element of the target sequence 105 corresponding to that processing element 120. The score is generated according to a predetermined comparison matrix, such as the PAM matrices described above. This score is used to generate the accumulated scores and maximum values which are shifted across the processor array 115, and eventually stored in the result table 125.

Figure 1B:
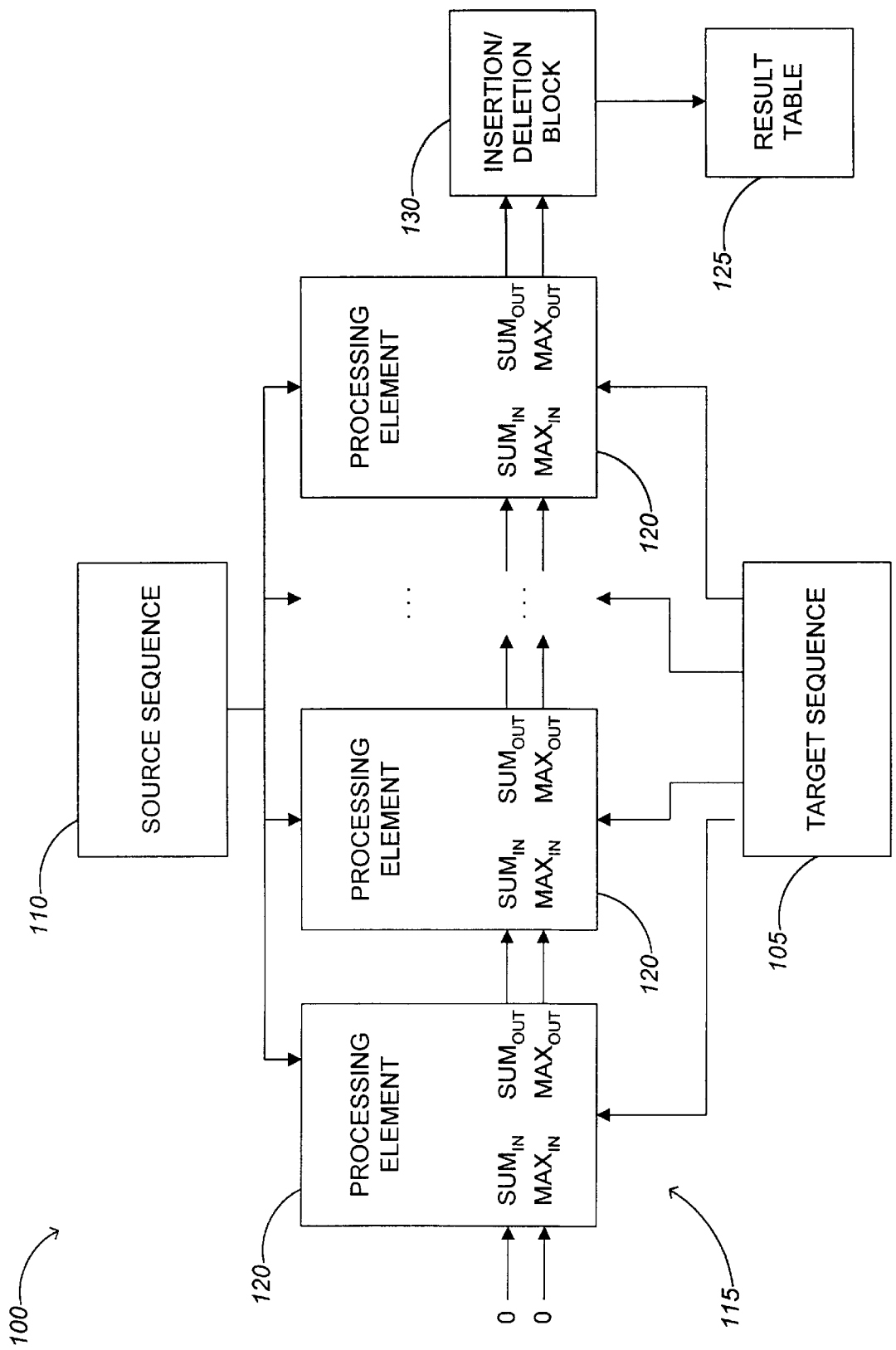
FIG. 1B shows an alternative implementation of the system shown in FIG. 1A.

FIG. 1B shows an alternative implementation of the system shown in FIG. 1A. An insertion/deletion block 130 is interposed between the final processing element 120 in the array 115 and the result table 125. The insertion/deletion block 130 adjusts the output of the system to reflect the possibilities of insertions or deletions in the source sequence 110 relative to the target sequence 105. The insertion/deletion block 130 receives the maximum values output by the final processing element 120. For each received maximum value, the insertion/deletion block 130 compares the maximum value to a threshold value. The threshold value is selected depending upon the application and represents a minimum score determined to be significant. If the maximum value is greater than or equal to the threshold value, the insertion/deletion block 130 stores the maximum value in a queue. If the maximum value is less than the threshold value, the insertion/deletion block 130 stores a default value, such as zero. The insertion/deletion block 130 stores a predetermined number of values in the queue, such as six. The predetermined number is selected to reflect statistical significance according to the application. The insertion/deletion block 130 adds the values in the queue and supplies that sum to the result table 125. As values are stored in the queue, the previously stored values are shifted forward through the queue with the end value being lost, maintaining a constant number of values. The queue is initially filled with default values, such as zero.

Accordingly, for each clock pulse, a maximum value passes from the final processing element 120 and into the insertion/deletion block 130. The insertion/deletion block 130 inserts the maximum value or a zero in the queue, adds the values in the queue, and outputs the sum to the result table 125. The result table 125 stores these sums in the same way as described above for the accumulated scores. The insertion/deletion block 130 can perform a similar operation for final accumulated scores output by the final processing element 120, or, alternatively, pass the final accumulated scores to the result table 125.

Figure 2:
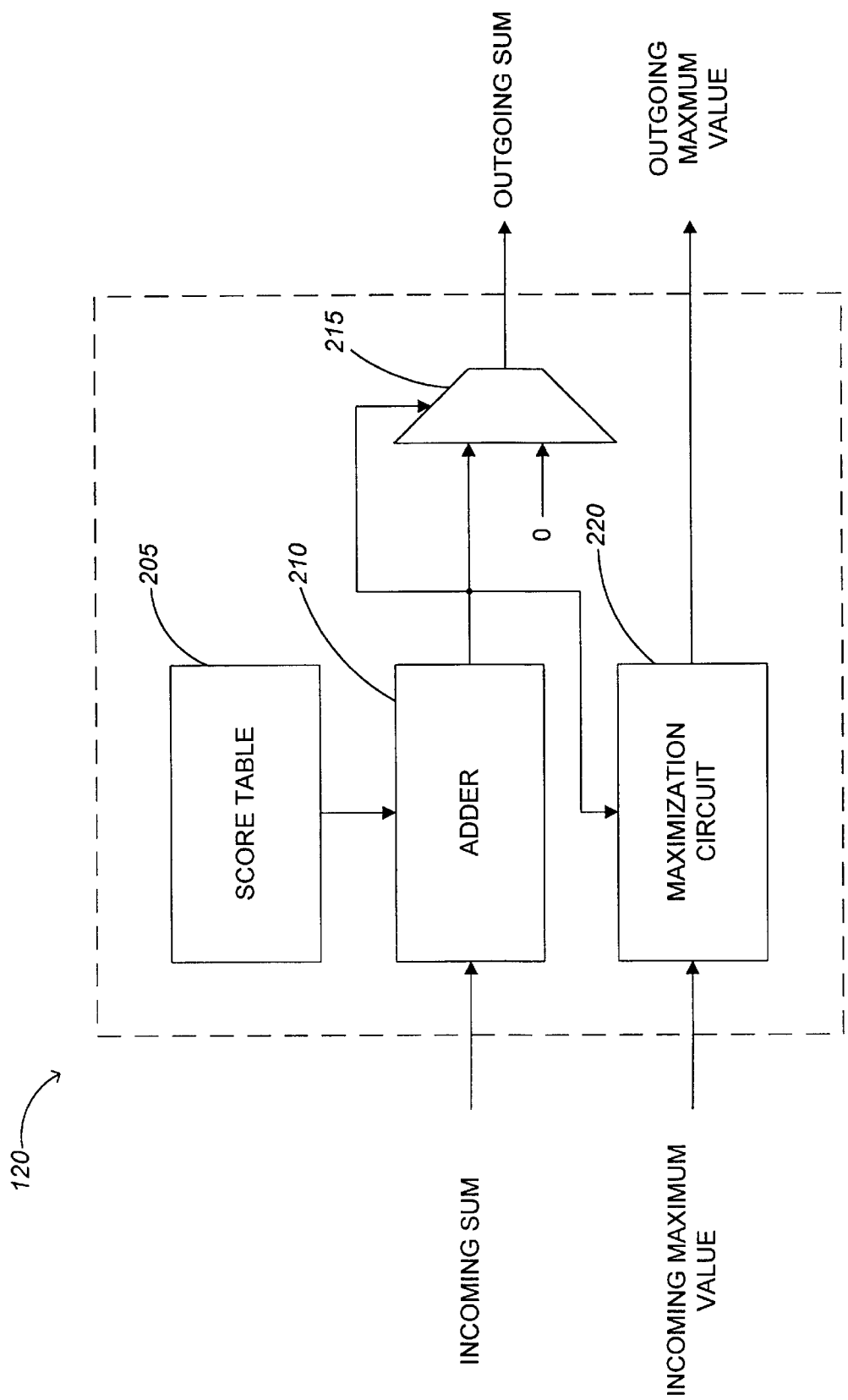
FIG. 2 shows a block diagram of the processing element shown in FIG. 1A.

FIG. 2 shows a block diagram of the processing element 120 shown in FIG. 1A. A score table 205 receives the current element from the database sequence 110. As noted above, each processing element 120 in the array 115 receives the same element of the database sequence 110 with each clock pulse. The score table 205 generates a score based on a comparison between the element of the database sequence 110 and the element of the target sequence 105 which corresponds to the processing element 120. For example, as described above, using a common scoring system for nucleic acid databases, where the database sequence element matches the target sequence element, the score is a 5, and where the elements do not match, the score is a −4. The score table 205 can also be implemented as an index of values accessed according to the database sequence element.

The score is supplied to an adder 210. The adder 210 also receives the accumulated score from the previous processing element 120 in the array 115. The adder 210 adds the score to the incoming accumulated score to produce a local score. The local score is supplied to an input of a 2:1 multiplexer 215. The second input of the multiplexer 215 is a predetermined value, such as zero. The control input of the multiplexer 215 is preferably controlled by the sign bit of the local score from the adder 210. Hence, where the local score is positive, the multiplexer outputs the local score from the adder 210. Where the local score is negative, the multiplexer 215 outputs zero. The output of the multiplexer 215 is supplied to the succeeding processing element 120 in the array 115 as the accumulated score for the succeeding processing element 120.

The local score generated by the adder 210 is also supplied to a maximization circuit 220. The maximization circuit 220 also receives an incoming maximum value from the preceding processing element 120 in the array 115. The maximization circuit 220 outputs the local score where the local score is larger than the maximum input value. The maximization circuit 220 outputs the maximum input value where the local score does not exceed the maximum input value. The output of the maximization circuit 220 is supplied to the succeeding processing element 120 in the array 115.

Figure 3:
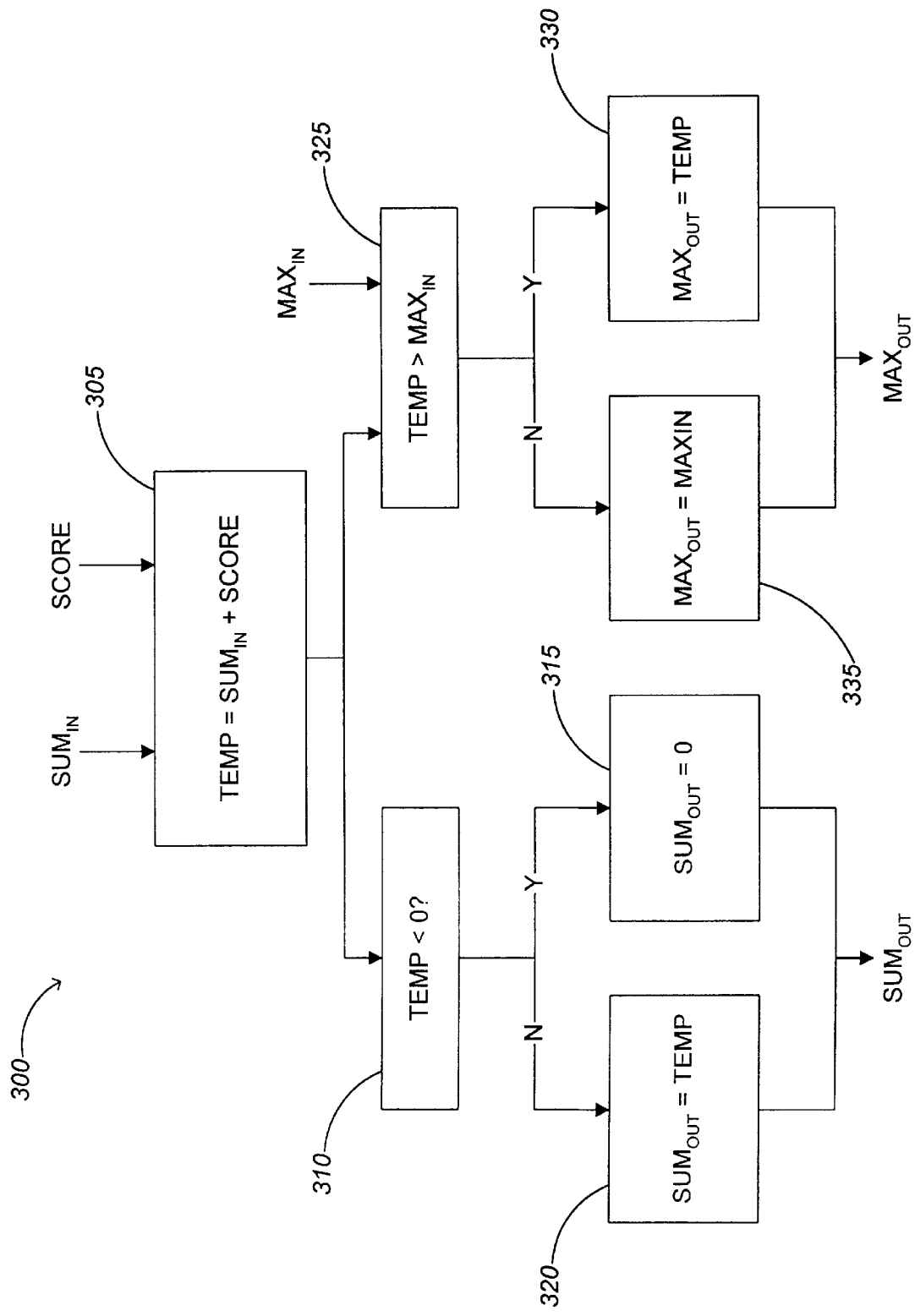
FIG. 3 shows a flow chart of a process for calculating the accumulated score and the maximum value for a processing element shown in FIGS. 1A and 2.

FIG. 3 shows a flow chart of a process 300 for calculating the accumulated score and the maximum value for a processing element 120 shown in FIGS. 1 and 2. An incoming sum or accumulated score and the score for the database sequence element are added to produce a temporary sum or local score 305. The temporary sum is compared to a predetermined accumulation value, such as zero 310. If the temporary sum is less than the accumulation value, the output sum or accumulated score is zero 315. If the temporary sum is not less than the accumulation value, the output sum is the temporary sum 320. The output sum is output by the processing element 120 to the next processing element 120 in the array 115 as the accumulated score.

The temporary sum is also compared to the maximum input value 325. If the temporary sum is greater than the maximum input value, the maximum output value is the temporary sum 330. If the temporary sum is not greater than the maximum input value, the maximum output value is the maximum input value 335. The maximum output value is supplied to the next processing element 120 in the array 115.

In an alternative implementation of calculating the accumulated score, the temporary sum is always output as the accumulated score to the succeeding processing element. The temporary sum is also compared to a predetermined comparison value, such as zero. If the temporary sum is less than this comparison value, the incoming sum or accumulated score from the preceding processing element is set to a default value, such as zero. This process can be used to avoid the propagation of negative values.

In another alternative implementation of calculating the accumulated score, the temporary sum is compared to a predetermined accumulation value, such as zero. If the temporary sum is greater than the accumulation value, the temporary sum is supplied to the succeeding processing element as the accumulated score. If the temporary sum is not greater than the accumulation value, the accumulated value from the preceding processing element is supplied to the succeeding processing element.

In an alternative implementation of calculating the maximum value, if the accumulated score from the preceding processing element is greater than the maximum input value, the incoming accumulated score is supplied to the succeeding processing element as the maximum output value. If the incoming accumulated score is not greater than the maximum input value, the maximum output value is the maximum input value.

Figure 4:
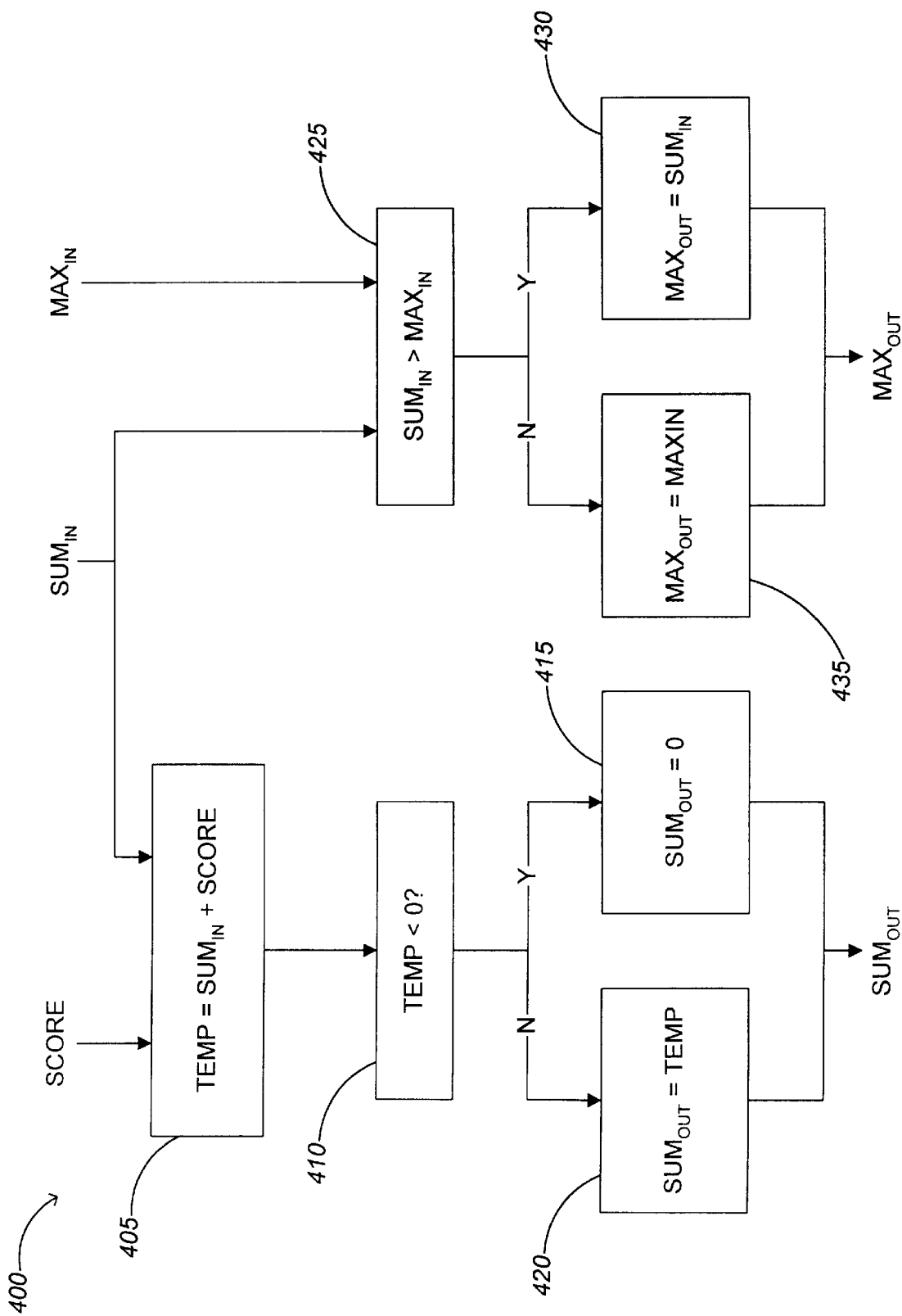
FIG. 4 shows a flowchart of an alternative process for determining the output sum or accumulated score and the maximum output value for a processing element in parallel.

FIG. 4 shows a flowchart of an alternative process 400 for determining the output sum or accumulated score and the maximum output value for a processing element 120 in parallel. An input sum received from the previous processing element 120 in the array 115 and the score for the database sequence element determined by the score table 205 in FIG. 2 are added to form a temporary sum 405. The temporary sum is compared to a predetermined value, such as zero, 410. If the temporary sum is less than this value, the output sum is zero 415. If the temporary sum is not less than zero, the output sum is the temporary sum 420. The output sum is supplied to the next processing element 120 in the array 115 as the accumulated score.

At the same time, the input sum is compared to the maximum input value 425. If the input sum is greater than the maximum input value, the maximum output value is the input summation 430. If the input sum is not greater than the maximum input value, the maximum output value is the maximum input value 435. The maximum output value is supplied to the next processing element 120 in the array 115.

Figure 5:
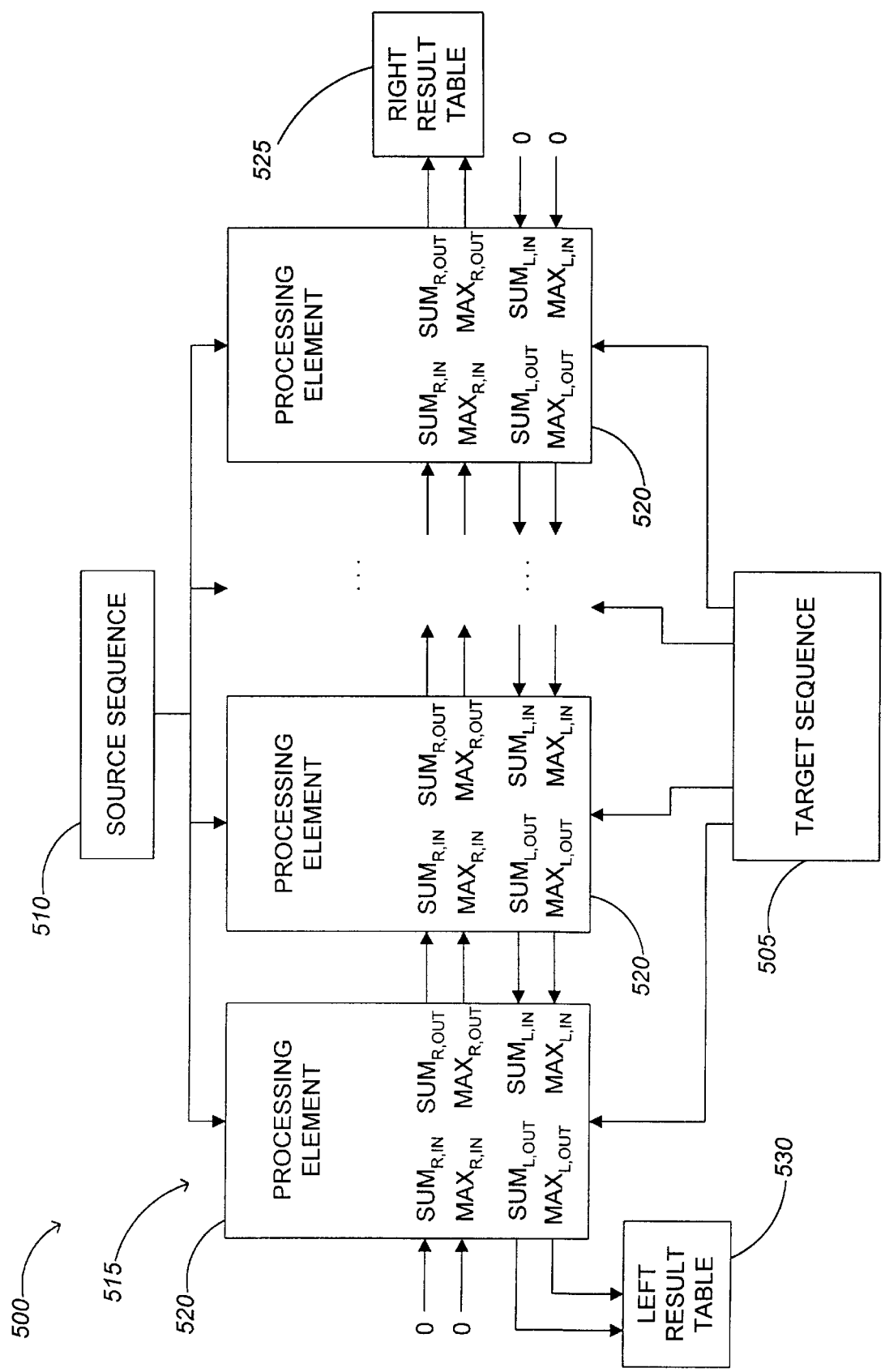
FIG. 5 shows an alternative configuration of a system for bidirectionally comparing a target sequence to a database sequence.

FIG. 5 shows an alternative configuration of a system 500 for bidirectionally comparing a target sequence 505 to a database sequence 510. The system 500 is similar to the system 100 shown in FIG. 1A, however, the target sequence 505 and database sequence 510 are simultaneously compared in two directions. Accordingly, in a parallel processor array 515 of processing elements 520, each processing element 520 is connected to two processing elements 520 in two directions (indicated as right and left in FIG. 5). A processing element 520 supplies an accumulated score to a succeeding processing element 520 in the first direction (indicated by the connection between $SUM_{R,OUT}$ and $SUM_{R,IN}$). The processing element 520 also supplies a maximum value to the succeeding processing element 520 in the first direction (indicated by the connection between $MAX_{R,OUT}$ and $MAX_{R,IN}$). In addition, the processing elements 520 supply accumulated scores and maximum values in the opposite direction (indicated by $SUM_{L,OUT}$, $SUM_{L,IN}$, $MAX_{L,OUT}$, and $MAX_{L,IN}$). The end processing elements 520 in the array 515 receive predetermined values, such as zero, to initialize the accumulated score and maximum values. The end processing elements 520 also supply as output the final accumulated score and final maximum value for the appropriate direction to a storage table 525 and 530. The right-most processing element 520 supplies the accumulated score and maximum value to a right storage table 525. The left-most processing element 520 supplies an accumulated score and maximum output valued to a left storage table 530. This configuration of bi-directional searching accomplishes two searches with minimal additions to the components of each of the processing elements and no increase in the time required. Accordingly, two searches are accomplished in the same time period as viewed by the system 100 shown in FIG. 1A.

In an alternative implementation, each processing element also passes a flag value to the succeeding processing element. The flag value indicates whether the local score at any processing element met a predetermined value for the corresponding alignment. When the local score of a processing element is greater than the flag criteria, a flag value of true is supplied to the succeeding processing element. When the local score is not greater than the flag criteria, the flag value received from the preceding processing element is supplied to the succeeding processing element. A value of false is supplied to the initial processing element in the array. The final processing element in the array supplies the flag value to the result table. Hence, each alignment has a corresponding flag value in the result table.

The technique can be implemented in hardware using parallel processors or in software using loops. In a software implementation, a loop emulates the parallel processor cells and shifting of the accumulated score throughout the processor array. The following pseudocode represents the body of one such loop:

$$M[i+1]=M[i]+S[k]$$

if
   (M[i+1]<0)
   M[i]=0
if
   (M[i+1]>max[i])
   max [i+1]=M[i]
else $$max[i+1]=max[i]$$

i represents time increments. M is the local sum and max is a maximum value for a particular alignment. S[k] is a value from a comparison matrix, where k is the corresponding index of the current database sequence symbol.

Numerous exemplary implementations have been described. However, additional variations are possible. For example, the base system can determine a score for the entire target sequence at each alignment in the database. Accordingly, the present disclosure is limited only by the scope of the following claims.

What is claimed is:

1. A method of comparing a target sequence of symbols having a first number of symbols against a source sequence of symbols having a second number of symbols, comprising:
   arranging and connecting a number of processing elements to form an array, wherein at least one processing element supplies an accumulated score to a succeeding processing element in the array;
   supplying each symbol of the target sequence to at least one corresponding processing element;
   supplying a symbol from the source sequence in parallel to all of the processing elements, so that each processing element receives the same source sequence symbol;
   determining a score based on the source sequence symbol and the processing element's target sequence symbol for each processing element;
   adding the score for a processing element to the accumulated score received by that processing element from a preceding processing element to generate a local score;
   comparing the local score to an accumulation value;
   when the local score is less than the accumulation value, supplying a default accumulation score to the succeeding processing element as the accumulated score; and
   when the local score is not less than the accumulation value, supplying the local score to the succeeding processing element as the accumulated score.

2. The method of claim 1, wherein the first number and the second number are different.

3. The method of claim 1, wherein the target sequence and the source sequence are genetic sequences.

4. The method of claim 1, wherein the processing element which is at a specified point of the array is connected to a result table, and supplies a final accumulated score to the result table, where the final accumulated score represents the similarity between the target sequence and at least a portion of the source sequence.

5. The method of claim 4, further comprising:
   storing a plurality of final accumulated scores;
   determining a smallest final accumulated score;
   when a new final accumulated score is greater than the smallest final accumulated score, replacing the smallest final accumulated score with the new final accumulated score.

6. The method of claim 1, wherein the processing element which is at a beginning of the array receives an initial accumulated score from an initial accumulated score generator.

7. The method of claim 1, wherein the accumulation value is 0.

8. The method of claim 1, wherein the default accumulation score is 0.

9. The method of claim 1, wherein at least one processing element supplies a maximum value to a succeeding processing element in the array, and further comprising:
   comparing the local score to the maximum value;
   when the local score is greater than the maximum value, supplying the local score to the succeeding processing element as the maximum value; and
   when the local score is not greater than the maximum value, supplying the maximum value from the preceding processing element to the succeeding processing element as the maximum value.

10. The method of claim 9, wherein the processing element which is at a specified point of the array is connected to a result table, and supplies a final maximum value to the result table, where the final maximum value represents the maximum similarity between the target sequence and at least a portion of the source sequence.

11. The method of claim 8, wherein the processing element which is at the end of the array is connected to an insertion/deletion block, and supplies a final maximum value to the insertion/deletion block, where the final maximum value represents the maximum similarity between the target sequence and at least a portion of the source sequence.

12. The method of claim 10, further comprising:
   comparing the final maximum value to a maximum threshold;
   when the final maximum value is greater than the maximum threshold, storing the final maximum value in a queue of values in the insertion/deletion block;
   when the final maximum value is not greater than the maximum threshold, storing a zero in the queue; and
   adding the values in the queue to generate a general similarity value, where the general similarity value represents the effect of insertions and deletions in the source sequence relative to the target sequence.

13. The method of claim 1, wherein at least one processing element supplies a maximum value to a succeeding processing element in the array, and further comprising:
   comparing the accumulated score from the preceding processing element to the maximum value;
   when the accumulated score from the preceding processing element is greater than the maximum value, supplying the accumulated score from the preceding processing element to the succeeding processing element as the maximum value; and
   when the accumulated score from the preceding processing element is not greater than the maximum value, supplying the maximum value from the preceding processing element to the succeeding processing element as the maximum value.

14. The method of claim 1, wherein at least one processing element supplies a flag value to a succeeding processing element in the array, and further comprising:
   comparing the local score to a flag threshold value;
   when the local score is greater than the flag threshold value, supplying a flag value equal to true to the succeeding processing element as the flag value; and
   when the local score is not greater than the flag threshold value, supplying the flag value from the preceding processing element to the succeeding processing element as the flag value.

15. The method of claim 14 wherein the processing element which is at the end of the array is connected to a result table, and supplies a final flag value to the result table, where the final flag value represents the similarity between the target sequence and at least a portion of the source sequence.

16. The method of claim 1, wherein the processing elements are also connected to form a second array and at least one processing element supplies a second accumulated score to a succeeding processing element in the second array, and further comprising:
   adding the score for a processing element to the second accumulated score received by that processing element from a preceding processing element in the second array to generate a second local score;

comparing the second local score to a second accumulation value;

when the second local score is less than the second accumulation value, supplying a second default accumulation score to the succeeding processing element in the second array as the second accumulated score; and when the second local score is not less than the second accumulation value, supplying the second local score to the succeeding processing element in the second array as the second accumulated score.

17. The method of claim 16, wherein the processing element which is at the end of the second array is connected to a second result table, and supplies a second final accumulated score to the second result table, where the second final accumulated score represents the similarity between the target sequence and at least a portion of the source sequence.

18. The method of claim 16, wherein the second array is the reverse of said array.

19. A method of comparing a target sequence of symbols having a first number of symbols against a source sequence of symbols having a second number of symbols, comprising:

arranging and connecting a number of processing elements to form an array, wherein at least one processing element supplies an accumulated score to a succeeding processing element in the array;

supplying each symbol of the target sequence to at least one corresponding processing element;

supplying a symbol from the source sequence in parallel to all of the processing elements, so that each processing element receives the same source sequence symbol;

determining a score based on the source sequence symbol and the processing element's target sequence symbol for each processing element;

adding the score for a processing element to the accumulated score received by that processing element from a preceding processing element to generate a local score;

comparing the local score to an accumulation value;

when the local score is less than an accumulation value, setting the accumulated score of the preceding processing element to a default accumulation score;

supplying the local score to the succeeding processing element as the accumulated score.

20. A method of comparing a target sequence of symbols having a first number of symbols against a source sequence of symbols having a second number of symbols, comprising:

arranging and connecting a number of processing elements are connected to form an array, wherein at least one processing element supplies an accumulated score to a succeeding processing element in the array;

supplying each symbol of the target sequence to a corresponding processing element;

supplying a symbol from the source sequence in parallel to all of the processing elements, so that each processing element receives the same source sequence symbol;

determining a score based on the source sequence symbol and the processing element's target sequence symbol for each processing element;

adding the score for a processing element to the accumulated score received by that processing element from a preceding processing element to generate a local score;

comparing the local score to an accumulation value;

when the local score is greater than the accumulation value, supplying the local score to the succeeding processing element as the accumulated score; and when the local score is not greater than the accumulation value, supplying the accumulated score from the preceding processing element to the succeeding processing element as the accumulated score.

21. A method of comparing a target sequence of symbols having a first number of symbols against a source sequence of symbols having a second number of symbols, comprising:

supplying each symbol of the target sequence to a corresponding processing element, where the processing elements are connected to form an array;

supplying a symbol from the source sequence in parallel to all of the processing elements, so that each processing element receives the same source sequence symbol;

determining a similarity value for each processing element based on the source sequence symbol, that processing element's target sequence symbol, and a shifted similarity value from a processing element preceding that processing element in the array; and shifting the similarity values through the array.

22. A method of comparing a first sequence of symbols having a first number of symbols against a second sequence of symbols having a second number of symbols, by providing a plurality of scores indicating the degree of similarity between respective subsets of said sequences, using a processing array including a plurality of processing elements connected in series, where each processing element computes a score of the similarity between said first sequence and said second sequence, each processing element receives as input a symbol from said second sequence and an accumulated score from a preceding processing element in said array, and each processing element outputs an accumulated score to a succeeding processing element in said array, the method comprising:

determining a score for a symbol in said second sequence for each processing element;

accumulating said score with said accumulated score from said preceding processing element to form a local score for each processing element;

when said local score is greater than a predetermined amount, propagating said local score to said succeeding processing element for each processing element;

when said local score is not greater than said predetermined amount, propagating said accumulated score to said succeeding processing element for each processing element; and where said accumulated score output by said processing element with no connection to a succeeding processing element is a similarity score between two subsets of said first sequence and said second sequence.

23. The method of claim 19, wherein each processing element also receives as input a maximum value from said preceding processing element, and further comprising:

comparing said accumulated score from said preceding processing element with said maximum value in each element;

when said accumulated score is greater than said maximum value, propagating said accumulated score to said succeeding processing element as said maximum value;

when said accumulated score is not greater than said maximum value, propagating said maximum value to said succeeding processing element as said maximum value; and where said maximum value output by said processing element with no connection to a succeeding processing element is a maximum similarity score between two subsets of said first sequence and said second sequence.

24. The method of claim 19, further comprising:

storing a predetermined number of said similarity scores;

determining a smallest of said stored similarity scores; and when a new similarity score is output by said array which is greater than said smallest stored similarity score, replacing said smallest stored similarity score with said new similarity score.

25. The method of claim 1, wherein each processing element also receives as input a flag from said preceding processing element, and further comprising:

comparing said local score with a predetermined value in each processing element;

when said local score is greater than said predetermined value, propagating a flag which is set to true to said succeeding processing element;

when said local score is not greater than said predetermined value, propagating said received flag to said succeeding processing element; and where said flag output by said processing element with no connection to a succeeding processing element is an indication of similarity between two subsets of said first sequence and said second sequence.

26. The method of claim 1, wherein each processing element also receives as input a reverse accumulated score from said succeeding processing element, and outputs a reverse accumulated score to said preceding processing element, and further comprising:

accumulating said score with said reverse accumulated score from said succeeding processing element to form a reverse local score in each processing element;

when said reverse local score is greater than a predetermined amount, propagating said reverse local score to said preceding processing element in each processing element;

when said reverse local score is not greater than said predetermined amount, propagating said reverse accumulated score to said preceding processing element in each processing element; and where said reverse accumulated score output by said processing element with no connection to a preceding processing element is a reverse similarity score between two subsets of said first sequence and said second sequence.

27. A system for comparing a target sequence of symbols having a first number of symbols against a source sequence of symbols having a second number of symbols, comprising:

a processor array for calculating an accumulated score based on comparing symbols of the target sequence to symbols of the source sequence, including a plurality of processing elements, where:

at least one processing element is connected to another processing element, all the processing elements receive a common symbol from the source sequence, and each processing element receives a different symbol from the target sequence; and a result storage table connected to the processor array for storing accumulated scores which represent which of the targets matches the source.

28. The system of claim 27, where each processing element comprises:

an incoming accumulated value input;

an outgoing accumulated value output;

a score table which receives the common symbol of the source sequence and the symbol of the target sequence corresponding to the processing element, and generates a score based on the symbols;

an adder connected to the incoming accumulated value input and the score table, which adds the incoming accumulated value and the score to generate a local score;

an accumulation value component for generating an accumulation value;

a comparator connected to the adder and the accumulation value component, which compares the local score and the accumulation value; and a switching device connected to the adder, the comparator, and the outgoing accumulated score output, where the switching device controls the value of the outgoing accumulated score.

29. The system of claim 28, where each processing element further comprises:

a default accumulation score generator connected to the switching device, which generates a default accumulation score.

30. The system of claim 28, where the switching device is connected to the incoming accumulated value input.

31. The system of claim 28, where each processing element further comprises:

an incoming maximum value input;

an outgoing maximum value output; and a maximization circuit connected to the incoming maximum value input and the outgoing maximum value output, which controls the value of the outgoing maximum value.

32. The system of claim 31, where the maximization circuit is connected to the adder and supplies the larger of the incoming maximum value and the local score to the outgoing maximum value output.

33. The system of claim 31, where the maximization circuit is connected to the incoming accumulated score input and supplies the larger of the incoming maximum value and the incoming accumulated score to the outgoing maximum value output.

34. The system of claim 24, wherein an insertion/deletion block is connected to the processor array, and the result table is connected to the insertion/deletion block, where the insertion/deletion block generates a general similarity score based on the output of the processor array, and where the general similarity score represents the effect of insertions and deletions in the source sequence relative to the target sequence.

* * * * *